W. MORRISON.
PROCESS OF PREPARING STORAGE BATTERY PLATES.
APPLICATION FILED DEC. 26, 1903.
935,316.
Patented Sept. 28, 1909.
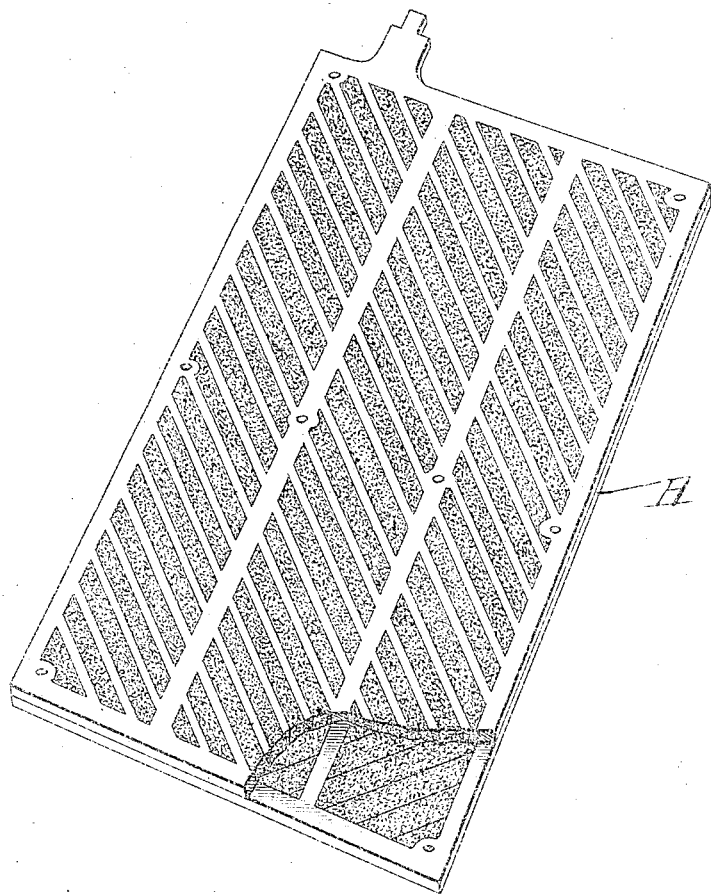

UNITED STATES PATENT OFFICE.

WILLIAM MORRISON, OF CHICAGO, ILLINOIS, ASSIGNOR, BY MESNE ASSIGNMENTS, TO DAVID P. PERRY, OF CHICAGO, ILLINOIS.

PROCESS OF PREPARING STORAGE-BATTERY PLATES.

935,316.

Specification of Letters Patent. Patented Sept. 28, 1909.

Application filed December 26, 1903. Serial No. 186,742.

*To all whom it may concern:*

Be it known that I, WILLIAM MORRISON, a citizen of the United States of America, and resident of Chicago, Cook county, Illinois, have invented a certain new and useful Improvement in Processes of Preparing Storage-Battery Plates, of which the following is a specification.

My invention contemplates an improved process or method of treating lead plates for lead storage batteries.

Generally stated, the object of my invention is to improve the character and increase the general serviceability of a lead storage battery plate.

A particular object is to provide such a process or method of treatment as will tend to improve the character of the active material of the lead plates—that is to say, such a method of treatment as will tend to increase the adhesiveness, toughness, hardness, etc., of the paste or active material employed in lead battery plates.

To the foregoing and other useful ends, my invention consists in matters hereinafter set forth and claimed.

The accompanying drawing shows a lead storage battery plate which can be subjected to my improved process or method of treatment for the purpose of improving the character of its paste or active material.

In carrying out my invention, I first take a lead grid or other suitable support, as, for example, the grid A shown in the drawing, and then fill the said grid or support with a suitable paste, in any ordinary or approved manner. In other words, the construction of the plate is unimportant, as far as the principle of my invention is concerned, and both the grid or support and the paste may be of any suitable known or approved character.

When the paste of the plate is thoroughly dry, I then dip the entire plate in a solution of glycerin and sulfuric acid, these ingredients being preferably combined or mixed together in the proportion of ten pounds of glycerin to eight gallons of sulfuric acid, the latter being of 1.2 specific gravity. This step in the process of treating the plate can be repeated, according to judgment—that is to say, it may include two or more dippings, the first quick and light, and the next heavier and of longer duration. Next, and after the plate has become thoroughly dry, I then dip it in a solution of formaldehyde, formic acid and water, and sulfuric acid. This solution is preferably formed by combining or mixing the said ingredients together in the proportion of two pounds of formaldehyde (40%), two pounds of formic acid (25%) and three gallons of water, together with enough sulfuric acid to bring the solution up to 1.2 specific gravity. This step in the process should be repeated as often as is necessary to give the desired degree of adhesiveness, toughness, hardness, etc., to the paste. The plate must then be thoroughly dried before it is placed in the battery.

A lead storage battery plate thus treated has a paste or material to become active which is very tough and hard and of such character as to have little tendency to crack or disintegrate or become dislodged from the grid or other suitable support. In this way, it is obvious that I provide a novel process or method of treatment which materially increases the serviceability of a lead storage battery.

What I claim as my invention is:

1. The process of preparing a storage battery plate, which includes as steps the filling of a lead plate or grid with paste in any suitable or desired manner, suitably drying the plate, and the subsequent dipping of the plate in a solution formed by mixing glycerin with sulfuric acid, and in another solution formed by mixing water with formaldehyde and formic acid and sulfuric acid.

2. The process of preparing a storage battery plate, which includes as steps the filling of a lead plate with paste in any suitable or desired manner, the drying of the plate, next the dipping of the plate in a solution formed by mixing glycerin with sulfuric acid, again drying the plate, the subsequent treatment of the plate with suitably prepared chemicals, said chemicals including formaldehyde and formic acid and sulfuric acid, and finally drying the plate.

3. The process of preparing a storage battery plate, which includes as steps the repeated immersion of the plate in different solutions formed by combining ingredients including glycerin, sulfuric acid, formaldehyde and formic acid.

Signed by me at Chicago, Cook county, Illinois, this 25th day of November, 1903.

WILLIAM MORRISON.

Witnesses:
A. F. DURAND,
WM. A. HARDERS.